(12) United States Patent
Schmüdderich

(10) Patent No.: US 9,969,388 B2
(45) Date of Patent: May 15, 2018

(54) METHOD AND SYSTEM FOR PREDICTING MOVEMENT BEHAVIOR OF A TARGET TRAFFIC OBJECT

(71) Applicant: HONDA RESEARCH INSTITUTE EUROPE GMBH, Offenbach/Main (DE)

(72) Inventor: Jens Schmüdderich, Offenbach (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 0 days. days.

(21) Appl. No.: 14/603,990

(22) Filed: Jan. 23, 2015

(65) Prior Publication Data
US 2015/0266477 A1 Sep. 24, 2015

(30) Foreign Application Priority Data

Mar. 24, 2014 (EP) .................................... 14161248

(51) Int. Cl.
*B60T 7/12* (2006.01)
*G05D 1/00* (2006.01)
*G06F 7/00* (2006.01)
*G06F 17/00* (2006.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC ........ B60W 30/0095; B60W 30/0953; B60W 30/0956
(Continued)

(56) References Cited

U.S. PATENT DOCUMENTS

| 2002/0019697 A1* | 2/2002 | Cong ................... G01S 13/723 701/301 |
| 2010/0010699 A1* | 1/2010 | Taguchi ................ G08G 1/163 701/23 |
| 2013/0054106 A1* | 2/2013 | Schmudderich .. B60W 30/0956 701/96 |

FOREIGN PATENT DOCUMENTS

| DE | 10 2005 002 504 A1 | 7/2006 |
| DE | 10 2010 020 047 A1 | 1/2011 |

(Continued)

OTHER PUBLICATIONS

European Search Report dated Oct. 14, 2014 corresponding to European Patent Application No. 14161248.1.
(Continued)

*Primary Examiner* — Imran Mustafa
(74) *Attorney, Agent, or Firm* — Squire Patton Boggs (US) LLP

(57) ABSTRACT

A method for computationally predicting future movement behavior of a target object and program includes producing sensor data by at least one sensor physically sensing the environment of a host vehicle, and computing a plurality of movement behavior alternatives of the target object sensed by the sensors. The computing includes predicting movement behaviors of the target object applying context based prediction using at least one indirect indicator and/or indicator combinations derived from senor data. In the context based prediction, a probability that the target object will execute a movement behavior is estimated. A future position of the target object is estimated and a signal representing the estimated future position is outputted. At least one history indicator for a movement behavior alternative is generated for a current point in time using at least one indicator of an indirect indicator at a point in the past.

13 Claims, 9 Drawing Sheets

(51) Int. Cl.
  *B60W 30/09*  (2012.01)
  *B60W 50/00*  (2006.01)
  *B60W 30/095* (2012.01)
  *B60W 30/16*  (2012.01)
  *B60W 30/18*  (2012.01)
  *B60W 40/04*  (2006.01)

(52) U.S. Cl.
  CPC ...... *B60W 30/18163* (2013.01); *B60W 40/04* (2013.01); *B60W 50/0097* (2013.01); *B60W 2530/14* (2013.01); *B60W 2550/10* (2013.01); *B60W 2550/30* (2013.01); *B60W 2750/30* (2013.01); *B60W 2750/306* (2013.01)

(58) Field of Classification Search
  USPC .......................................... 701/96, 300, 301
  See application file for complete search history.

(56) References Cited

FOREIGN PATENT DOCUMENTS

| | | |
|---|---|---|
| EP | 2 172 919 A1 | 4/2010 |
| EP | 2 562 060 A1 | 2/2013 |
| EP | 2 571 004 A1 | 3/2013 |
| JP | 2011-002869 A | 1/2011 |
| JP | 2011-221698 A | 11/2011 |

OTHER PUBLICATIONS

Japanese Patent Office, Office Action for corresponding Appln. No. 2014-252916, dated Jan. 27, 2016.

\* cited by examiner

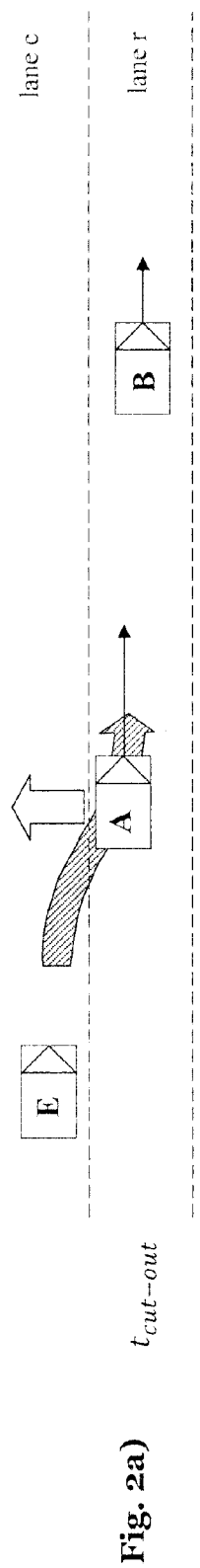
Fig. 2a) $t_{cut-out}$
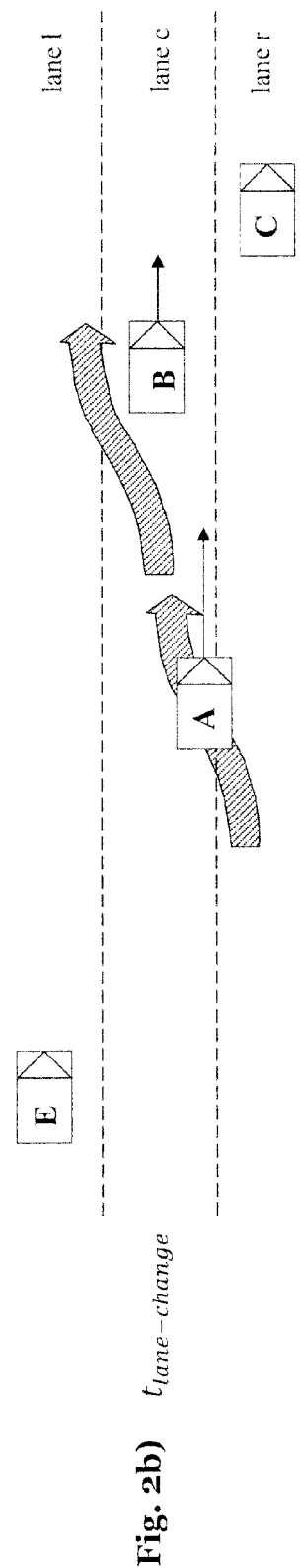
Fig. 2b) $t_{lane-change}$

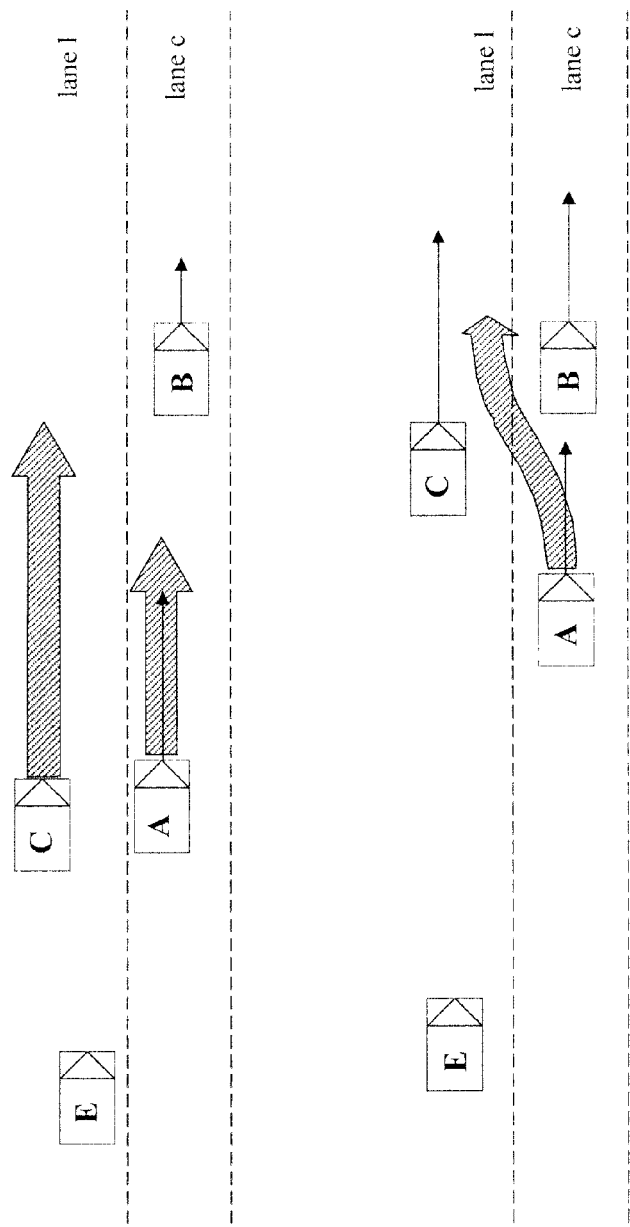

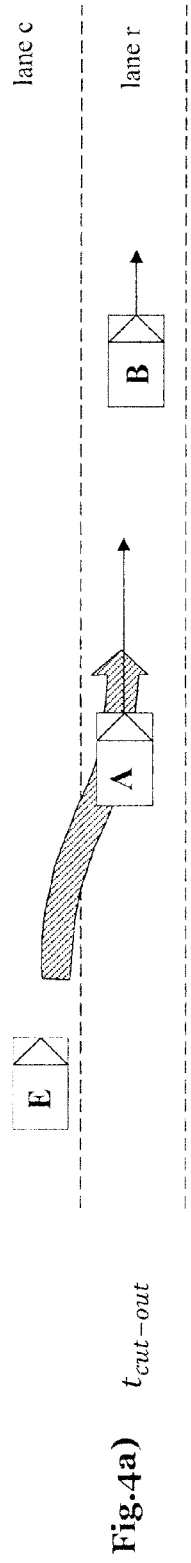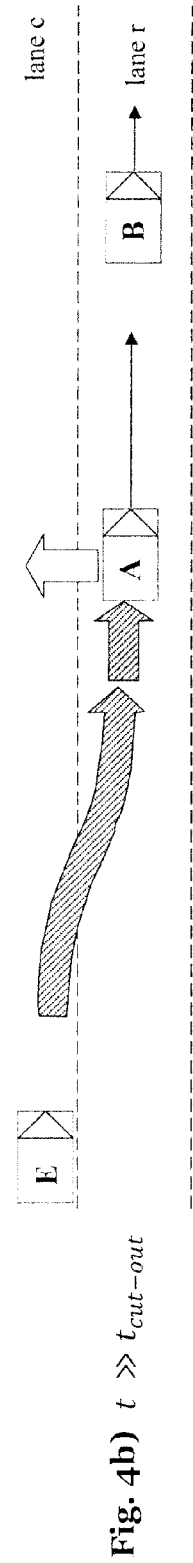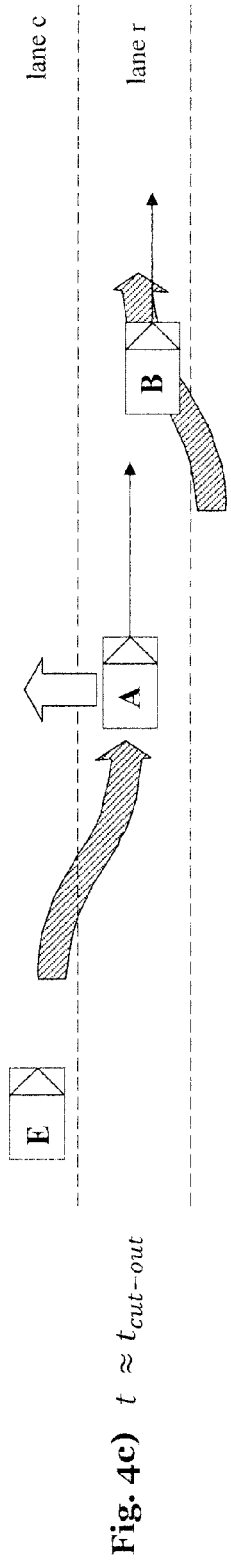

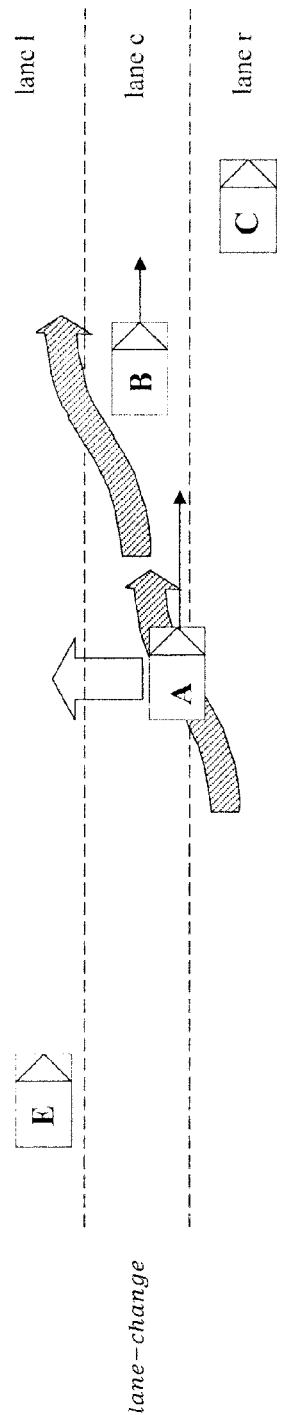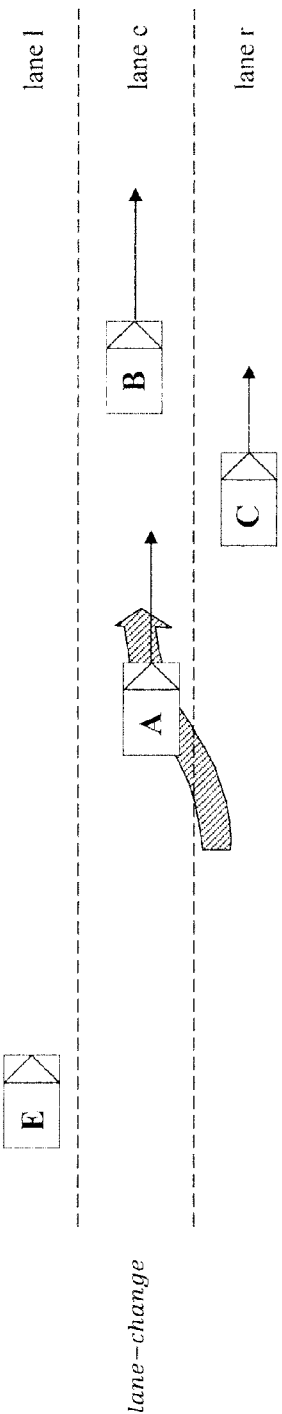
Fig. 6a)
Fig. 6b)

METHOD AND SYSTEM FOR PREDICTING MOVEMENT BEHAVIOR OF A TARGET TRAFFIC OBJECT

BACKGROUND

Field

The present invention relates to the field of automated, computerized driver assistance in air, land or sea vehicles, where a sensor of a host vehicle physically senses the environment of the host vehicle, and a computing unit, supplied with an output signal of the sensor, computes a signal which assists in the guidance of the host vehicle when supplied to optical or acoustical indication means and/or when being supplied to an actuator or a controller unit for controlling such actuator of the vehicle. The actuator of the vehicle might be a safety device (airbag, . . . ) or an actuator influencing the movement of the vehicle (flaps, brakes, accelerator, steering, . . . ).

Description of the Related Art

Driver assistance systems such as "Adaptive Cruise Control" (ACC) systems (e.g. described in ISO-Norm 15622: 2010) increase driver comfort and safety. They are especially used for carrying out longitudinal control of a host vehicle, for example with respect to a velocity specified by the driver and ranging to other traffic objects such as other land, air or sea vehicles (cars, motorbikes, bikes, trucks, etc.), pedestrians, . . . . The host vehicle is provided with ("hosts") a sensor physically sensing the host vehicle's environment and a computing unit processing an output signal of the at least one sensor.

One problem of commonly known driver systems is that usually the system takes into consideration only behavior of other traffic vehicles when the behavior can already be recognized (physical prediction). For example if one of the target objects (a vehicle in the environment of the host vehicle and physically sensed by one or more sensors of the host vehicle) changes the lane thereby cutting into the lane of the host vehicle or cutting out to another lane, the host vehicle which observes the other traffic vehicles only reacts after such lane change is certain. As a consequence, the reaction of the host vehicle is delayed which has a negative influence on the traffic flow and in particular on the comfort of the driver of the host vehicle.

In EP 2 562 060 A1 it was proposed to use in addition to a so-called physical prediction furthermore a context-based prediction. In such context-based prediction a probability of the future behavior of a target object is calculated. This future behavior is then confirmed or dismissed by the physical prediction. For calculating the probabilities of possible future behavior of the target objects, indirect indicators are used which do not only allow the observation of a behavior of the target object when it already has started. From the calculated probabilities, it is possible to recognize situations that make a particular behavior of the target objects likely to happen.

One problem of such approach is that for context-based prediction only the current situation of the traffic situation of the host vehicle is taken into consideration. Thus, at a particular point in time, the context-based prediction may for example give the result that a target vehicle which is on a neighboring lane will cut in the lane of the host vehicle because the target vehicle quickly approaches a predecessor vehicle. According to EP 2 562 060 A1, this will result in decelaration of the host vehicle, because in such a situation it is likely that the target vehicle will cut in to overtake the slower predecessor vehicle. But the situation that is the basis for such estimation in any case has a history. Firstly, it could of course well be that the target vehicle in fact was on the neighboring lane for a long time and therefore will in fact overtake the predecessor vehicle. But secondly, it could also be possible that in a situation previous to the one that is the basis for the context-based prediction, the target object was the predecessor of the host vehicle and in order to let the host vehicle overtake changed lane to the neighboring lane. As a result of this previous behavior, the target vehicle now quickly approaches its predecessor, but a probability that this target object again cuts in before it was overtaken by the host vehicle is rather low. The known context-based prediction therefore would deliver a wrong result.

According to previous proposals, no history is taken into consideration when an estimation for a future behavior of target objects is made. The quality of prediction of such systems is therefore quite limited.

It is hence an object of the invention to provide a method and system capable of alleviating the above problem.

SUMMARY

The invention hence solves the above problem by the system and method according to the independent claims. Advantageous embodiments and aspects are defined in the subclaims.

For understanding, the invention disclosed herein it is important to distinguish between the context based prediction or recognition of a movement behavior, i.e. the determination of "what" will happen (context based prediction), and a physical prediction, i.e. the determination of "how" it will happen. While context based prediction uses at least indirect indicators, the physical prediction uses direct indicators, as defined below.

The computerized context based prediction including knowledge about previous development of a traffic situation therefore employs principles that are also used by humans to predict traffic behavior. In particular, the inventive approach acknowledges the fact that relations between traffic participants are evaluated to obtain key indicators to predict behaviors, but previous behavior of a target object or a change of the entire scene thereby causing for example a discontinuation of a boundary for a behavior of a target object are taken into consideration. Relations can e.g. be physical or symbolic.

A physical relation describes the relative position and movement between two or more traffic participants. An indicator based upon a physical relation thus evaluates e.g. the relative position and velocity to compute a value characteristic for a special movement behavior.

For example if a target vehicle intends to change lane to a target lane, there is a physical relation between this target vehicle and a potential further vehicle on the target lane. An indicator evaluating this relation could e.g. output a value characteristic for the movement behavior stay on current lane if the target-vehicle would hit the further vehicle if both continued their current movement. On the other hand the indicator could output a value characteristic for the movement behavior change lane if there is a gap sufficient for a lane change.

A symbolic relation describes a rule between one or more traffic participants and one road infrastructure element, such as e.g. traffic-lights, signs, and road/lane markings An indicator based upon a symbolic relation evaluates e.g. the state of a road-infrastructure element and its applicability to a target object to compute a value characteristic for a special movement behavior.

For example if a vehicle is driving on the speed lane and approaching a no-passing sign, there is a symbolic relation between the sign and the vehicle. An indicator evaluating this relation could output a value characteristic for the movement behavior "lane-change-right" if the sign is applicable to the vehicle.

Although the present invention is not limited to road traffic, the examples that are given afterwards and the explanations are made with respect to road traffic. But it is evident that the explained examples may easily be transferred to systems for assistance in air or on sea.

Definitions

Host vehicle: A host vehicle is a vehicle in a traffic situation which has the prediction system according to the invention mounted thereon and which is equipped with the sensors and a computing system that allows the computation of a likely future behavior of other traffic vehicles.

Sensor: A sensor may be any means that can deliver information suitable for describing a traffic scene at a point in time. Such sensors may be cameras, radar, lidar or the like.

Target object (target vehicle): A target object or vehicle is an object or vehicle being observed by generating information by at least one sensor and for which a future behavior shall be estimated.

$x_i^t$: traffic object i at time t with $x_i^t = (p_{i,x}{}^t, p_{i,z}{}^t, v_{i,x}{}^t, v_{i,z}{}^t, a_{i,x}{}^t, a_{i,z}{}^t)^T$, $p_{i,x}{}^t$, $P_{i,z}{}^t$ being the lateral and longitudinal position, $v_{i,x}{}^t$, $v_{i,z}{}^t$ being the lateral and longitudinal velocity, and $a_{i,x}{}^t$, $a_{i,z}{}^t$ being the longitudinal and lateral acceleration of traffic object i at time t.

$S^t$: scene at time t, consisting of all perceived traffic objects and road environment (lanes, lane-markings, traffic signs, traffic-lights, etc.) at time t.

B={b}: set of behaviors a traffic object ("participant") can perform. In the following $b_i^t \in B$ will be used to denote the behavior traffic participant $x_i^t$ is performing at time t.

Indicators:

We define indicators $$I = \bigcup_j \tau_j(\cdot)$$

as a set of functions $$\tau_j(x^t, S^t) = (v_j^t, c_j^t) \quad (1)$$

where $v_j^t$ is measurable variable conveying information about the future or ongoing behavior of a target vehicle at time t and $c_j^t$ a confidence about the true-state of the variable $v_j^t$. The confidence $c_j^t$ is obtained by combining the sensor-confidence of all elements of $S^t$, which have been evaluated for the computation of $v_j^t$, where the sensor confidence is a value for the reliability of the sensed information. Without loss of generality indicators can be defined such that $v_j^t \in [0,1]$, i.e. the values are normalized between 0 and 1 e.g. by means of a Fermi-function. Such a normalization is useful for the combination of indicators as described below.

It is differentiated between direct and indirect indicators.
Direct indicators $I_D \subset I$:
Direct indicators provide variables, which are observable if and only if the behavior to be detected has started. E.g. for predicting a lane-change, direct indicators are lateral velocity, lateral position relative to the lane, changing orientation relative to the lane, or changing orientation relative to other traffic participants.

Orientations as such are always observable, but the change of orientation can only be observed when the vehicle is changing lanes, because then it is rotating around the yaw-axis. A position change is detected, because the lateral velocity is the change of lateral position over time.

Indirect indicators $I_I \subset I$:

Indirect indicators provide variables, which are already observable before the predicted behavior starts. We define indirect indicators as the set of all possible indicators without the set of direct indicators:

$$I_I = I \setminus I_D \quad (2)$$

There are two types of indirect indicators:
1. The first type of indicators relates to information about a relation between at least one traffic participant and one or more other traffic participants or static scene elements.

For example at least one of the following indicators can be available:

fitting-left-gap: $\tau_{fitting-left-gap}(x_i^t, S^t)$ provides a value $v_{fitting-left-gap}{}^t \approx 1$ if a gap fitting to $x_i^t$'s position, velocity, and length is now or soon available on the left lane. Let $x_{lp}^t$ depict the predecessor of $x_i^t$ on the left neighboring lane of $x_i^t$, and let $x_{ls}^t$ depict the successor of $x_i^t$ on the left neighboring lane of $x_i^t$. Then a gap is defined by a frontal position, a rear position, a frontal velocity, and a rear velocity. The frontal position and frontal velocity equal those of $x_{lp}^t$, the rear velocity equals that of $x_{ls}^t$. The rear position equals that of $x_{ls}^t$, plus the length of $x_{ls}^t$ and a speed-dependent safety-margin. If $x_{lp}^t \notin S^t$, i.e. $x_i^t$ has no left predecessor, then the frontal position and velocity are set to infinity. If $x_{ls}^t \notin S^t$, i.e. $x_i^t$ has no left successor, then the rear position and velocity are set to zero.

The fitting of a gap g to a vehicle $x_i^t$ can be determined by multiple factors:

The ratio of the length of $x_i^t$ and the gap size,
the longitudinal TTC (Time To Contact) of $x_i^t$ with the gap's frontal border, defined as the longitudinal TTC between $x_i^t$ and $x_{lp}^t$, with the longitudinal TTC defined as $$ttc_z(x_i^t, x_j^t) = (p_{i,z}{}^t - p_{j,z}{}^t)/(v_{j,z}{}^t - v_{i,z}{}^t) \quad (3)$$

the longitudinal TTC of $x_i^t$ with the gap's rear border, and the time when the gap is available, the so called "Time To Gap" (TTG). If $x_i^t$ is behind the gap g, then the TTG equals the longitudinal TTC to the gaps rear border. If $x_i^t$ is ahead of g, the TTG equals the longitudinal TTC to the frontal gap border. If the gap is available now, then the TTG equals zero.

fitting-right-gap: In analogy $\tau_{fitting-right-gap}(x_i^t, S^t)$ provides a value $v_{fitting-right-gap}{}^t \approx 1$ if a fitting gap is available on the right neighboring lane of $x_i^t$. Here the gap is defined by the predecessor $x_{rp}^t$ and successor $x_{rs}^t$ on the right lane.

approaching-predecessor: The indicator $\tau_{approaching-predecessor}(x_i^t, S^t)$ provides a value $v_{approaching-predecessor}{}^t \approx 1$ if $x^t$ is approaching a nearby predecessor on its own lane. This is derived from the longitudinal TTC between $x_i^t$ and its predecessor.

fitting-left-lane: $\tau_{fitting-left-lane}{}^t(x_i^t, S^t)$ creates a value $v_{fitting-left-lane}{}^t \approx 1$ if the lane left of $x_i^t$ fits well to $x_i^t$'s driving. This is computed by the TTC between $x_i^t$ and its predecessor on the left lane and/or by comparing the current speed of $x_i^t$ with the average speed driven on the left lane.

fitting-current-lane: $\tau_{fitting-current-lane}^t(x_i,{}'S^t)$ creates a value $v_{fitting-current-lane}^t \approx 1$ if the lane of $x_i^t$ fits well to $x_i^t$'s driving. This is computed by the TTC between $x_i^t$ and its predecessor and/or by comparing the current speed of $x_i^t$ with the average speed driven on $x_i^t$'s lane.

fitting-right-lane: $\tau_{fitting-right-lane}^t(x_i,{}'S^t)$ creates a value $v_{fitting-right-lane}^t \approx 1$ if the lane right of $x_i^t$ fits well to $x_i^t$'s driving. This is computed by the TTC between $x_i^t$ and its predecessor on the right lane and/or by comparing the current speed of $x_i^t$ with the average speed driven on the right lane.

tailgating: $\tau_{tailgating}(x_i,{}'S^t)$ creates a value $v_{tailgating}^t \approx 1$ if $x_i^t$ is tailgating its predecessor on its own lane. This is computed by the ratio of the longitudinal distance between $x_i^t$ and its predecessor, divided by the velocity-depended safety-distance.

evade-to-gap: $\tau_{evade-to-gap}(x_i,{}'S^t)$ creates a value $v_{evade-to-gap}^t \approx 1$ if $x_i^t$ is approaching its predecessor on its own lane and if a fitting gap is or will be available before $x_i^t$ collides with its predecessor. This is computed by the difference between the longitudinal TTC and TTG, in combination with the indicators $\tau_{approaching-predecessor}(\bullet)$ and $\tau_{fitting-left-gap}(\bullet)$, where ($\bullet$) is a placeholder for an arbitrary argument.

accelerate-to-gap: $\tau_{accelerate-to-gap}(x_i,{}'S^t)$ creates a value $v_{accelerate-to-gap}^t \approx 1$ if $x_i^t$ is accelerating (or breaking), and if this acceleration is necessary to better fit to a gap's position or velocity (i.e. the gap is moving due to the movement of the predecessor and successor on the left or right neighboring lane with their velocity). This is evaluated by computing the TTC considering the gap's and the $x_i^t$'s acceleration and combining the results with the above indicator accelerate-despite-ttc: $\tau_{accelerate-despite-ttc}(x_i,{}'S^t)$ creates a value $v_{accelerate-despite-ttc} \approx 1$ if $x_i^t$ is accelerating faster than its predecessor, and if the TTC between the two is low.

successor-approaching: $\tau_{successor-approaching}(x_i,{}'S^t)$ provides a value $v_{approaching-successor}^t \approx 1$ if $x_i^t$ is approached by a nearby successor on its own lane. This is derived from the longitudinal TTC between $x_i^t$'s successor and $x_i^t$.

free-lane: $\tau_{free-lane}(x_i,{}'S^t)$ provides a value $v_{free-lane} \approx 1$ if the lane ahead of $x_i^t$ is free, i.e. if there is no predecessor in the sensor range.

free-lane-and-let-overtake: $\tau_{free-lane-and-let-overtake}(x_i,{}'S^t)$ provides a value $v_{free-lane-and-let-overtake}^t \approx 1$ if $x_i^t$ has no predecessor (indicated by $\tau_{free-lane}(\bullet)$) and there is a gap on the neighboring lane (indicated by $\tau_{fitting-right-gap}(\bullet)$) and $x_i^t$ has a successor $x_s^t$ on its lane, which is so fast, that $x_i^t$ can cut-out into g, $x_s^t$ can overtake, and $x_i^t$ can cut back in to its originating lane without the need to adapt its velocity to g. This part of the indicator is estimated by comparing the longitudinal TTC between $x_i^t$ and g and the TTG between $x_i^t$ and the gap built by $x_s^t$ and the successor of $x_s^t$.

traffic-signs: This group of indicators produce values $v_{traffic-sign}^t \approx 1$ if $x_i^t$ has to adapt its behavior to comply with a traffic-sign. E.g. speed-sign indicators, e.g. a speed limit-signs, produce a high value if $x_i^t$ is faster than indicated by the speed-sign. A no-passing sign produces a high value if $x_i^t$ is on the left-lane/speed-lane and if it is addressed by the no-passing sign.

lane markings: This group of indicators produce values $v_{lane-makings}^t \approx 1$ if $x_i^t$ has to adapt its behavior to comply with the lane-markings. E.g. a line-end indicator could produce a high value if $x_i^t$ is driving on a lane, which is about to end. Or a dashed-line indicator could produce a low value if $x_i^t$ is driving on a lane which does not permit lane-changes.

combinations of the above: The indicators above can be recombined to create new indicators. E.g. $\tau_{fitting-left-gap}(\bullet)$ can be combined with $\tau_{approaching-predecessor}(\bullet)$ to an indicator which gives a high value if a gap is available and $x_i^t$ is approaching $x_p^t$. The combination is done in a way that a high value of one of the indicators can compensate for a medium value of the other indicator. This is achieved by a weighted summation of the two values:

$$v_{combined} = \min(1, w_1 v_{fitting-left-gap} + w_2 v_{approaching-predecessor})$$

with $\sum_i w_i > 1$.

2. The second type of indirect indicators conveys information about the driver intention, actively communicated by the traffic participant whose behavior is to be predicted. Examples are:

turning-signal: This indicator produces a high value if the target vehicle's turning signal is activated.

breaking-light: This indicator produces a high value if the target vehicle's breaking light is activated.

car-to-car-communication: This group of indicators can respond to communicated changes of the sending vehicle's velocity or heading.

As an alternative to the described indicators one could also use indicators which are not normalized to [0,1]. In particular, threshold values could be defined indicating whether an indicator is present or not. Therefore, when a threshold is exceeded, the respective indicator is deemed to be present.

BRIEF DESCRIPTION OF THE DRAWINGS:

FIGS. 2a and 2b: Examples for situations where state of the art context-based prediction does not give proper results.

FIGS. 3a and 3b: Further examples for a situation with an unsatisfying prediction result of state of the art systems.

FIGS. 4a-4c: Schematics for illustrating the solution for avoiding unsatisfying prediction results in the situation of FIG. 2a.

FIGS. 6a and 6b: Schematics for illustrating the solution for avoiding unsatisfying context-based prediction results of FIG. 2b.

Figure 1:
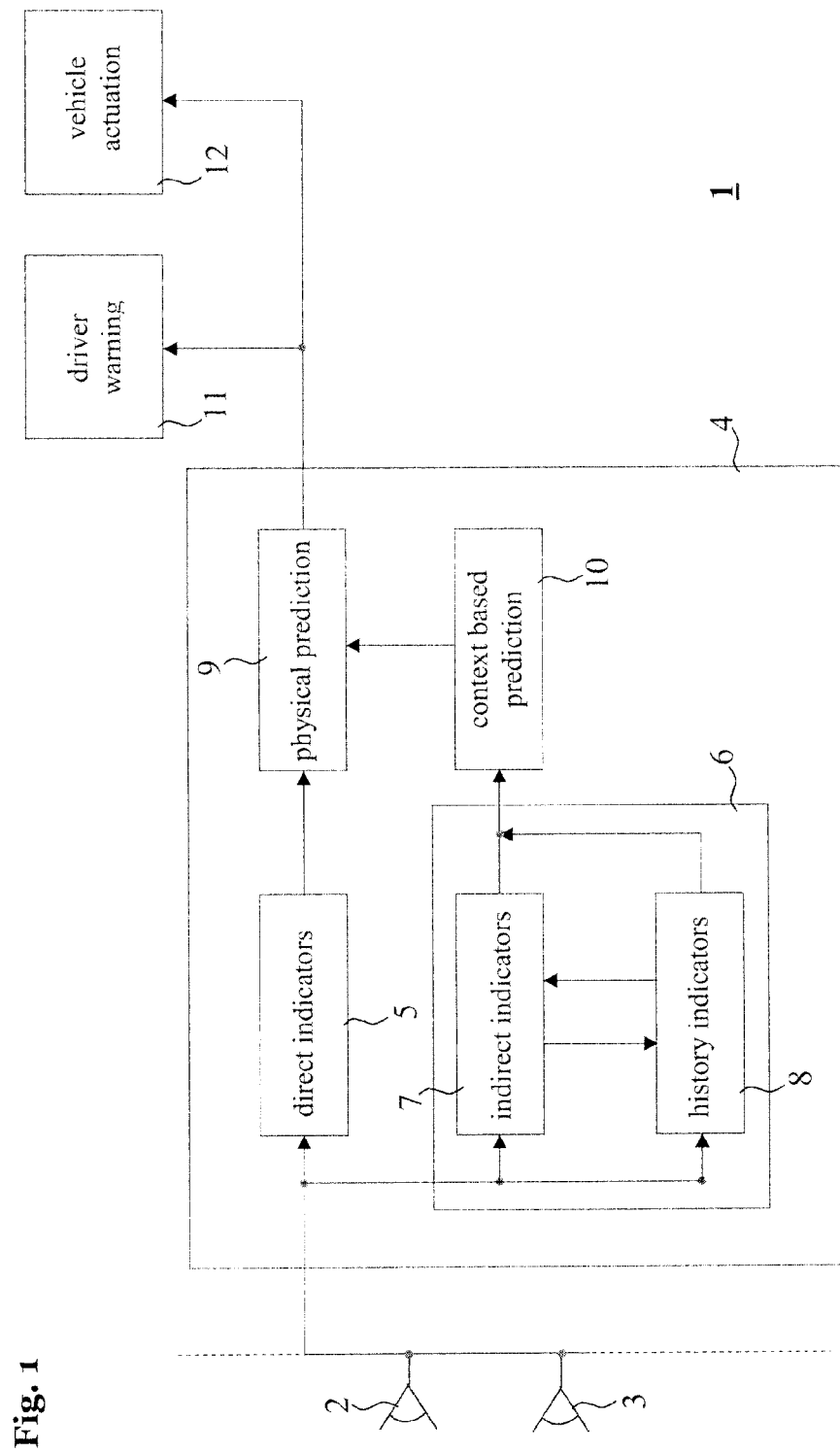
FIG. 1: Overview over the inventive driver assistance system.

DETAILED DESCRIPTION:

The inventive system and method is now described in view of the figures.

The method according to the invention assumes to be performed on/by the host-vehicle or a respective computing system on board of the host-vehicle being equipped with one or more sensors.

The computing system relates to a system for performing the necessary computing or calculation operations. This system may be specially constructed for this purpose, or it may comprise at least a general-purpose computer selectively activated or reconfigured by a computer program stored in the computer. The computing system can also consist of a network of (different) processors.

Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs for increased computing capability.

The computing system is especially functionally connected to the at least one sensor. The inventive method can be applied in form of a computer program. It can be stored on a computer readable medium and is executed when run on the computing system.

The at least one sensor can be e.g. a visual sensor (e.g. a camera, a laser scanner, infra-red camera, . . . ) and/or an acoustical sensor (e.g. a microphone, a radar, an ultrasonic sensor, . . . ).

The at least one sensor according to the invention is especially configured to detect other traffic-participants, especially vehicles, and to measure their location and velocity.

In addition the sensor can detect road infrastructure elements, such as traffic-lights, signs, and road/lane markings The at least one sensor is also configured to estimate their location and state, where the definition of state depends on the type of infrastructure element. (There are known approaches for the skilled person for detecting traffic signs, etc. based on camera-images and/or navigation-data.)

For example a traffic-light can be in at least one of the states of displaying a signal (such as green, yellow, red) or out-of-order. A traffic-sign can be assigned to a class of traffic-signs, such as no-passing sign, speed-limitation, etc. Road-markings states may indicate curvature and type of lane and can e.g. be dashed, solid, or one-sided dashed.

The at least one sensor can also be configured to receive messages from inter-vehicle communication and/or to estimate target-vehicles' positions, velocities, accelerations, and further states (car-to-car-communication). Additionally this sensor can receive messages from infrastructure-communication to estimate position and state of road environment (car-to-infrastructure-communication).

The at least one sensor is especially configured to estimate the host vehicle's position, velocity, and acceleration.

Of course it is also possible to use different and specific sensors for some or all of the above tasks. E.g. a GPS can be used for obtaining positioning information, while an accelerometer can be used to get information on the acceleration. Also a plurality of visual and/or acoustical sensors can be used to obtain information on the environment of the host-vehicle, e.g. to determine the positions of the other traffic participants and/or the state of the road infrastructure elements.

To estimate a future behavior of the target object, the probability for the target vehicle to perform one of a set of possible future movement behaviors is estimated by the so called context based prediction as explained below. Of course such estimation can be performed for any traffic object as target object for which a sufficient database may be achieved by the at least one sensor.

In FIG. 1 an overview over the entire advanced driver assistance system used for predicting future movement behavior of target objects is illustrated. The advanced driver assistance system 1 comprises at least one sensor 2. As it is indicated in the figure further sensors 3 or even more may be present. The sensors 2, 3, . . . may be of different type or may be of the same type and can in particular be provided at the host vehicle such that in particular the driving direction of the host vehicle can be observed. The sensors 2, 3, . . . are configured to measure the relative speed, position or any other variable that allows to determine the relation between traffic participants or may be configured to detect road infrastructure elements. The measured values are provided to a prediction system 4. The prediction system 4 comprises a direct indicator calculating unit 5 for calculating direct indicators on the basis of the signals that are received from the sensors 2, 3. The signals containing information about position, speed, . . . that is sensed by sensors 2, 3 is further provided to a unit 6 for calculating indicators for the context-based prediction. These indicators may comprise conventionally calculated indirect indicators which are calculated from the signals of sensors 2, 3 in an indirect indicator calculation unit 7, but also history indicators which are calculated in the history indicator calculating unit 8.

The direct indicators are supplied to a physical prediction unit 9 and the indirect indicators as well as the history indicators are supplied to a context-based prediction unit the context-based prediction calculation unit 10. It is to be noted that in the illustrated embodiment, the history indicators thus are calculated as further indirect indicators in addition to the conventionally calculated indirect indicators. Thus, the history indicators as well as the conventionally calculated indirect indicators are supplied to the context-based prediction calculation unit 10. The history indicators are taken into consideration in the context-based prediction as input indicators. As an alternative, it is also possible to base the context-based prediction solely on the conventionally calculated indirect indicators and thereafter suppress or boost the be outcome of the context-based prediction calculation unit 10 on the basis of the calculated history indicators.

The result of the context-based prediction calculation is then fed to the physical prediction calculation unit 9 for example for validation reasons and plausibility check as it is in detail explained in EP 2 562 060 A1 which is therefore explicitly referred to. In the end, a signal is output by the prediction system 4 that causes either a driver warning for information to be performed in a respective warning unit 11 which may be for example in the simplest case a signal light. Furthermore, additionally or alternatively, the signal is supplied to a vehicle actuation unit that might be either directly actuated on the basis of the signal or by means of a controlling unit that receives a signal provided by the prediction system 4 as an input. Typically, the output signal is used for throttle control and/or brake control.

Before the details of the invention are now explained, the context-based prediction as it is essential for the understanding of the invention is now explained.

Context Based Prediction

Context based prediction consists of a set of classifiers $\Gamma^b = \{\gamma_j^b\}_{j=1 \ldots N_t}$ where each classifier $\gamma_j^b$ estimates a probability p $(b_i^{t+\Delta t}|x_i^t, S^t, \gamma_j^b)$ that a target vehicle $x_i^t$ will execute behavior $b \in B$ at a time $t+\Delta t$. For each behavior b a different set of classifiers can be used.

Here, B={lane-change-left, lane-change-right, follow-lane}. A feature-vector $f_{ji}^{bt}$ is computed for each $x_i^t$ and each classifier $\gamma_j^b$ based on the indirect indicators, where $$f_{ji}^{bt} = (f_{ji1}^{bt}, \ldots, f_{jiN_j}^{bt})^T \quad (4)$$

$$f_{jik}^{bt} = \tau_k(x_i^t, S^t), \quad (5)$$

with $\tau_k(\cdot) \in I_I^j \subset I_I$. (6)

The probability of $x_i^t$ performing behavior b at time $t+\Delta t$ is the estimate:

$$p(b_i^{t+\Delta t} | x_i^t, S^t) \propto \sum_{j=1}^{N_b} \omega_j p(b_i^{t+\Delta t} | x_i^t, S^t, \gamma_i^b) \quad (7)$$

$$p(b_i^{t+\Delta t} | x_i^t, S^t, \gamma_i^b) = \gamma_j^b(f_{ji}^{bt}) \quad (8)$$

That means, for each behavior, the probability is estimated by a weighted combination of set of multiple classifiers, each using a different set of indicators.

To allow for early prediction before the start of the behavior, no direct indicators need to be used.

In consequence the context based prediction is capable of determining the class of the future behavior, but not the concrete execution in terms of time and space of the movement of $x_i^t$. In other words, the context based prediction can estimate the probability of each behavior $b \in B$ to happen roughly at time $t+\Delta t$, but the exact $\Delta t$ and position $p_{i,x}^{t+\Delta t}$, $p_{i,z}^{t+\Delta t}$ at time $t+t$, of $x_i^t$ are unknown.

Additionally or as an alternative to a context based prediction that does not use any direct indicators as described above, a classifier could be used, which dynamically includes direct and indirect indicators based on the prediction time $\Delta t$. For example, the classifier could use indirect indicators for $\Delta t > 2s$ and could fade to direct indicators for $\Delta t < 1s$.

Before now the integration of history information into the context based prediction according to the invention is explained in detail, examples of situations where the known context-based prediction comes to its limits shall be explained.

FIG. 2a shows a first example, where vehicle A being the target object in the beginning is driving ahead of the host vehicle E. When the driver of vehicle A recognizes that vehicle E approaches from behind, many drivers use a gap on lane r to let host vehicle E overtake. In FIG. 2a there is illustrated the situation where vehicle A just left lane c and now is assigned to lane r by the prediction system. This point in time is denoted as t index $t_{cut-out}$.

As it is indicated by the length of the thin arrows of vehicle A and vehicle B, vehicle A drives faster than vehicle B. As a result in such a situation where vehicle A assigned to lane r, a conventional context-based prediction system would estimate that it is likely that vehicle A cuts in to lane c. Having in mind the history indicated by the thick arrow showing the previously performed cut-out of vehicle A, it is more likely that vehicle A will stay on lane r until vehicle B has overtaken. Thus, the conventional context-based prediction would be misleading and lead for example to a deceleration of the host vehicle.

A similar situation is depicted in FIG. 2b. Here we have a three-lane road and vehicle A at a point in time $t_{lane-change}$ performed a lane change from lane r to lane c which is neighboring the host vehicle's lane c. Furthermore, vehicle A has approximately the same speed as vehicle B. Although lane r would fit to the situation of vehicle A well, the driver of vehicle A accepted that changing the lane from lane r to lane c leaded to a lane which fits the situation of vehicle A worse than before. Conventional context-based prediction systems do not take into consideration such previously lane change but only the current situation on the neighboring lane c with vehicle A following vehicle B at the comparable speed. Therefore conventional systems cannot recognize that the worse fitting of lane c is accepted only because the intention of vehicle A's driver is to further change to lane l. Thus, conventional context-based prediction systems would only recognize that the speed of vehicle A and the speed of vehicle B are approximately the same and therefore come to the conclusion that no lane change from lane c to lane l will occur.

FIGS. 3a and 3b show a third example where the limitation of previously known context-based prediction becomes obvious. In FIG. 3a, the situation at a first point in time t−T is shown. Here, the host vehicle E observes that target vehicle A is faster than vehicle B so that vehicle A approaches vehicle B. Without vehicle C driving in front of vehicle E, the system would predict that vehicle A would cut into the lane l of the host vehicle E. But at that point of time t−T vehicle C is driving besides vehicle A and thus effectively preventing A from changing lane. This is recognized by the host vehicle E and thus $v_{fitting-left-gap}^t \approx 0$. At this point in time, which is defined as t−T, there was no chance for vehicle A to change the lane, so vehicle A had to reduce its speed.

FIG. 3b shows the situation at the current point in time t (time difference to FIG. 3a: T). At that point in time t, vehicle A already reduced its speed to be similar to the speed of vehicle B in order to avoid a collision. Thus, at a point of time t when there is a gap available on lane l, because vehicle C already passed vehicle A (vehicle C is faster than vehicle A), a conventional context-based prediction system would still not conclude that vehicle A cuts into lane l because vehicle A is not approaching vehicle B at the time $t_{fitting-gap}$ when the gap is available.

In FIGS. 3a and 3b there is no point in time where a conventional prediction system would correctly calculate that vehicle A cuts in. As long as vehicle A drives faster than vehicle B, which means $t < t_{fitting-left-gap}$ no gap was available and for $t \geq t_{fitting-left-gap}$ the speed of vehicle A is approximately the same as the speed of vehicle B. Consequently, $v_{approaching-predecessor}^t \approx 0$ In order to avoid wrong predictions, the prediction system according to the invention uses knowledge about the history of a traffic situation by using not only indicator values of current point in time t. This might be knowledge about a previous behavior of the target object or change of one or more indicators, e.g. $\tau_{fitting-left-gap}$ and $\tau_{approaching-predecessor}$, because of vehicle C blocking the gap for vehicle A only for a certain period of time.

For the situation shown in FIG. 2a), the cutout of vehicle A (lane change from lane c of the host vehicle E to lane r) is taken into consideration. To understand how a history indicator based on the knowledge of the history of the current situation is generated, three situations are illustrated in FIG. 4. FIG. 4a) shows the situation at cutout time $t_{cut-out}$ which means that vehicle A is assigned to lane r at cut-out time $t_{cut-out}$. b) shows a point in time $t \gg t_{cut-out}$ for which the cut-out happened so long ago that vehicle A shall be predicted to cut in. If the time difference between the cut-out time t and $t_{cut-out}$ and the current time t is very long, the situations are unrelated. Thus, the conventional context-based prediction delivers a correct result and no overruling of the result or suppression of a wrong prediction is necessary. This means that although target vehicle A in the past cut out from lane c to lane r at current time $t \gg t_{cut-out}$, the cut-in has to be expected in case that the speed of vehicle A is greater than the speed of vehicle B, thus vehicle A is approaching vehicle B which is indicated by $v_{approaching-predecessor}^{t} \approx 1$.

The situation is different as illustrated in FIG. 4c. Here the situation is shown at a current point in time $t \approx t_{cut-out}$ which lies only shortly after the cutout time $t_{cut-out}$. Contrary to situation a), where no cut-in shall be predicted, because it is assumed that vehicle A intentionally left lane c, here lane r suddenly becomes not suitable for vehicle A, because vehicle B cuts into the lane of vehicle A. This results in a sudden reduction of the distance between vehicle A and vehicle B that can be used for estimating that despite the recent cutout of vehicle A the cut-in has to be expected. A discontinuity between $v_{approaching-predecessor}^{t_{cut-out}} \approx 0$ at $t_{cut-out}$ and $v_{approaching-predecessor}^{t} \approx 1$ at current time t can be detected.

Figure 5:
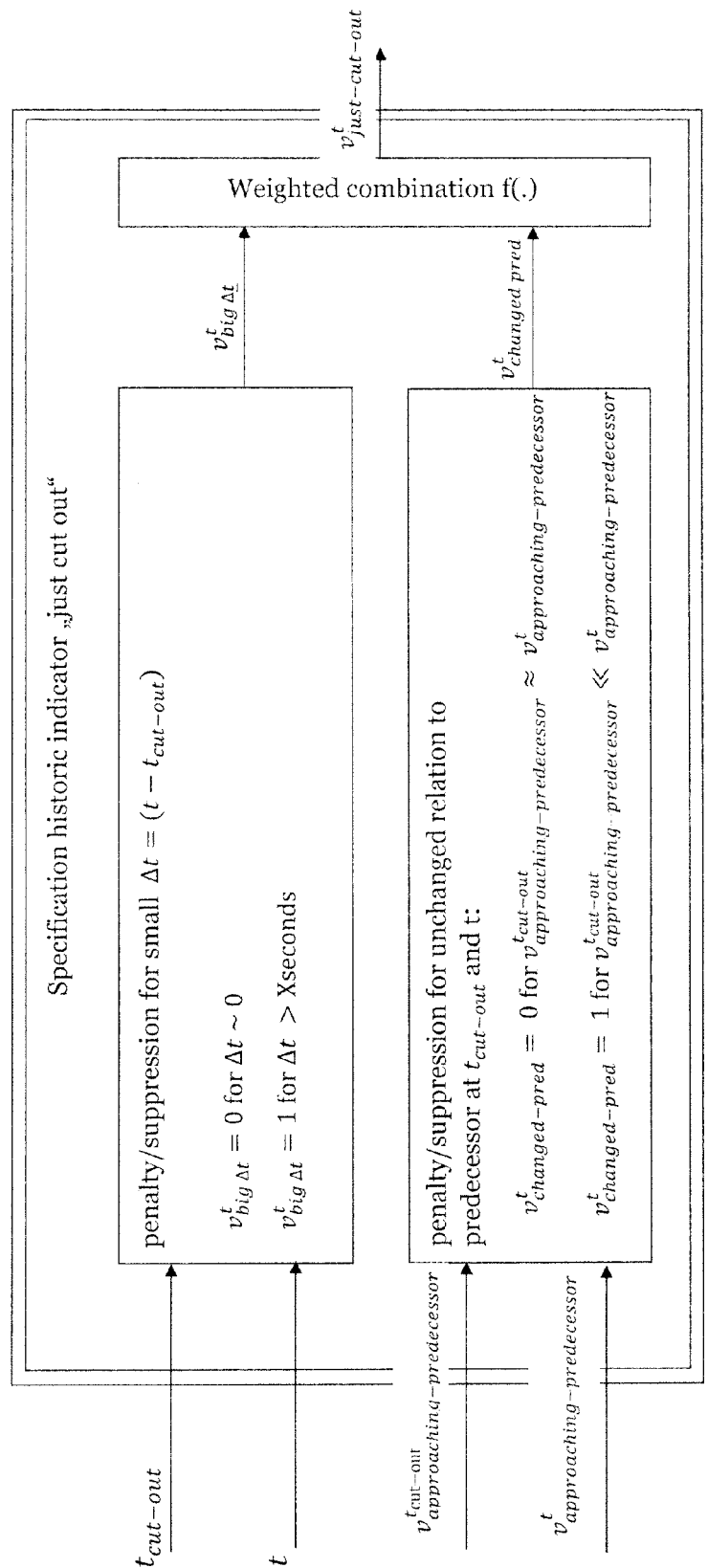
FIG. 5: Schematic illustrating generation of a history indicator according to FIGS. 4a-4c.

FIG. 5 gives an overview about the conditions explained above which are taken into consideration in order to calculate the history indicator value $v_{just-cut-out}^{t}$ of history indicator $\tau_{just-cut-out}$ that gives a measure for vehicle A cutting back into lane l. In FIG. 5 there is shown a detailed view of the history indicator calculation unit 8 of FIG. 1. In the history indicator calculator unit 8 a first indicator value $v_{big \, \Delta t}^{t}$ and a second indicator value $v_{changed-predecessor}^{t}$ are calculated. These two indicator values $v_{big \, \Delta t}^{t}$ and $v_{changed-predecessor}^{t}$ change are then combined to generate the history indicator value $v_{just-cut-out}^{t}$.

In order to determine the first indicator value $v_{big \, \Delta t}^{t}$ the current time t and the point in time $t_{cut-out}$ where A is first assigned to lane r after being assigned to lane c are used as input. The time $t_{cut-out}$ is determined on the basis of observation of the target object vehicle A by sensors 2, 3, . . . The previous behavior "cut-out" of vehicle A is stored in a memory associated with the point in time $t_{cut-out}$. Based on the point in time $t_{cut-out}$ of the cut-out and on the current time t a time difference value Δt is calculated. In case the time difference value Δt is small the first indicator value $v_{big \, \Delta t}^{t}$ is 0. In case that the time difference value Δt is relatively big and thus exceeds a predetermined threshold the first indicator value $v_{big \, \Delta t}^{t}$ is 1. It is preferred that two thresholds are used so that the first indicator value $v_{big \, \Delta t}^{t}$ is 0 up to the first threshold and then increases to be 1 for Δt exceeding a second, higher threshold. The slope between the first threshold and the second threshold can follow for example a fermi function or be linear or any other function.

In addition to this first indicator value $v_{big \, \Delta t}^{t}$ the second indicator value $v_{changed-predecessor}^{t}$ is calculated on the basis of the indicator $\tau_{approaching-predecessor}$ for approaching the predecessor on new lane r of vehicle A. As an input to the history indicator calculation unit 8 the indicator value for approaching the predecessor at two different points in time $t_{cut-out}$ and t is used. The indicator value $v_{approaching-predecessor}^{t_{cut-out}}$ calculated for time $t_{cut-out}$ and the indicator value $v_{approaching-predecessor}^{t}$ calculated for the current time t are used for determining the second indicator value $v_{changed-predecessor}^{t}$. The second indicator value $v_{changed-predecessor}^{t}$ is set to 0 in case that the indicator value $v_{approaching-predecessor}^{t_{cut-out}}$ at cut-out time $t_{cut-out}$ is approximately the same as the current indicator value $v_{approaching-predecessor}^{t}$ which means that the situation for vehicle A has not changed between the point in time at which it was first assigned to lane r and current time t. The second indicator value is set to 1 on the other hand in case that the indicator value $v_{approaching-predecessor}^{t_{cut-out}}$ at cutout time $t_{cut-out}$ is significantly smaller than at the current time t. By doing so it is taken into consideration that the situation changed because of the cut in of a third vehicle auto lane r which is in FIG. 4c) vehicle B. This results in a sudden increase of the indicator value for approaching the predecessor. The first indicator value $v_{big \, \Delta t}^{t}$ and the second indicator value $v_{changed-predecessor}^{t}$ then are combined to calculate the history indicator value $v_{just-cut-out}^{t}$ for history indicator $\tau_{just-cut-out}$. This history indicator is then used to calculate a prediction for the behavior of cutting in of vehicle A. The indicator values that are needed for the calculation of the first and second indicator values are provided by the indirect indicator calculation unit 7. Since indicator values from the past are needed the indicator values that are generated in indirect indicator calculation unit 7 are stored in a memory (not shown).

Referring to the calculation of the context-based prediction as explained above the history indicator can be directly used as an input which means the history indicator is used as a further indirect indicator. Alternatively, the history indicator may be used to suppress the output of the classifier.

In FIGS. 6a) and 6b) two situations are shown where vehicle A changes the lane to a neighboring lane of vehicle E at $t_{lane-change}$ but different prediction results at current time t are necessary. In a) vehicle A changes from lane r to lane c, although lane r would fit to the driving situation of vehicle A better than lane c. Consequently, it is to be expected that vehicle A performs a further lane change onto lane l thereby cutting into lane l of the host vehicle E. Such a situation might for example occur in case that vehicle A just drove onto a motorway and intends to go faster but is still in the acceleration.

The situation is different in FIG. 6b), because here at $t_{lane-change}$ lane c already fitted better than lane r. Thus, it is to be assumed that the driver of vehicle A is satisfied with driving on lane c and will not perform a further cut-in on lane l.

Figure 7:
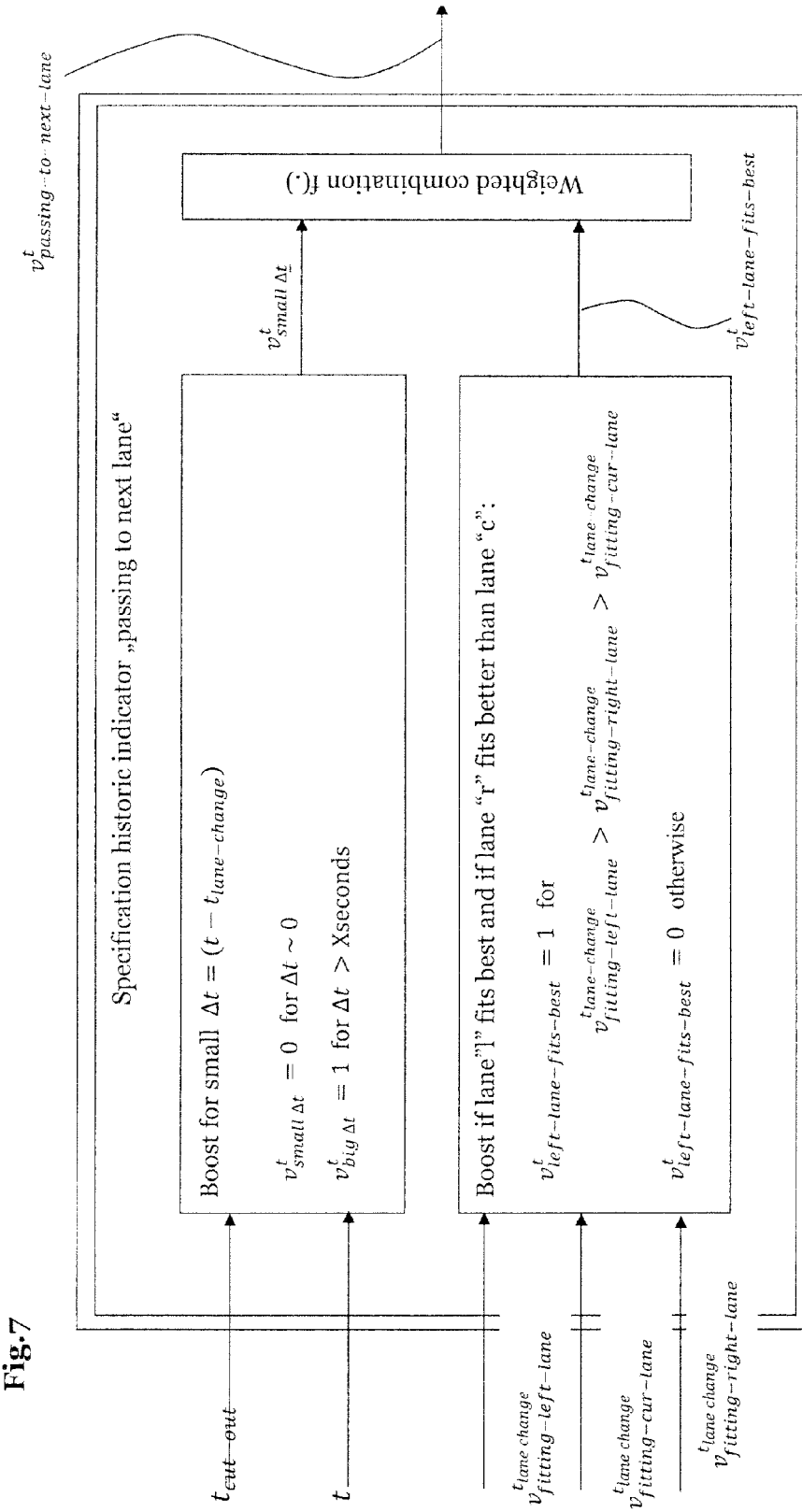
FIG. 7: Schematic illustrating generation of the history indicator in the situation of FIGS. 6a and 6b.

Again, in FIG. 7 a schematic of history indicator calculating unit 8 is shown how to generate the history indicator for this situation c passing to next lane.

The first indicator value $v_{small \, \Delta t}^{t}$ again is calculated on the basis of the point in time $t_{lane-change}$ where a previous lane-change of the target object which is vehicle A is observed. As a further input the current time t is used again and the time difference Δt between the current time t and the time $t_{lane-change}$ of observed previous behavior (the lane change from lane r to lane c) is used. In case that At is approximately 0 the first indicator value $v_{small \, \Delta t}^{t}$ is set to 1. Contrary, with increasing Δt the first indicator value $v_{small \, \Delta t}^{t}$ converges to 0.

To calculate for history indicator $\tau_{passing-to-next-lane}$ its history indicator value $v_{passing-to-next-lane}^{t}$ the first indicator value $v_{small \, \Delta t}^{t}$ is combined with a second indicator value $v_{left-lane-fits-best}^{t}$ again. This second indicator value $v_{left-lane-fits-best}^{t}$ is computed by comparing the indicator values $v_{fitting-left-lane}^{t_{lane-change}}$, $v_{fitting-current-lane}^{t_{lane-change}}$ and $v_{fitting-right-lane}^{t_{lane-change}}$ at the time of the lane change $t_{lane-change}$ vehicle A. The second indicator value $v_{left-lane-fits-best}^{t}$ is set to 1 in case that the center lane c fits worst to vehicle A and that the lane of the host vehicle (lane l) fits best. This represents the situation where the driver of vehicle A accepts worsening his situation temporarily by changing from lane r to lane c because after that he wants to further change to lane 1 which fits best. History indicator $\tau_{passing-to-next-lane}$ is boosted in case that the first indicator value $v_{small \, \Delta t}^{t}$ indicates that only a short time has elapsed since the first lane change to lane c was performed by vehicle A, because then it is more likely that the further lane change to lane 1 may occur. On the other hand, if the first lane change to lane c was performed quite a while ago, indicated by a big $\Delta t$, or in any case where the lane of the host vehicle (here: lane 1) does not fit best or the new lane to which vehicle B changed (here: lane c) fits better than its original lane (here: lane r) no lane change has to be predicted and thus the first indicator value $v_{small \, \Delta t}^{t}$ and/or the second indicator value $v_{left-lane-fits-best}^{t}$ are set to 0, resulting in a combined indicator value $v_{passing-to-next-lane}^{t}$ of 0 for the history indicator $\tau_{passing-to-next-lane}$.

Figure 8:
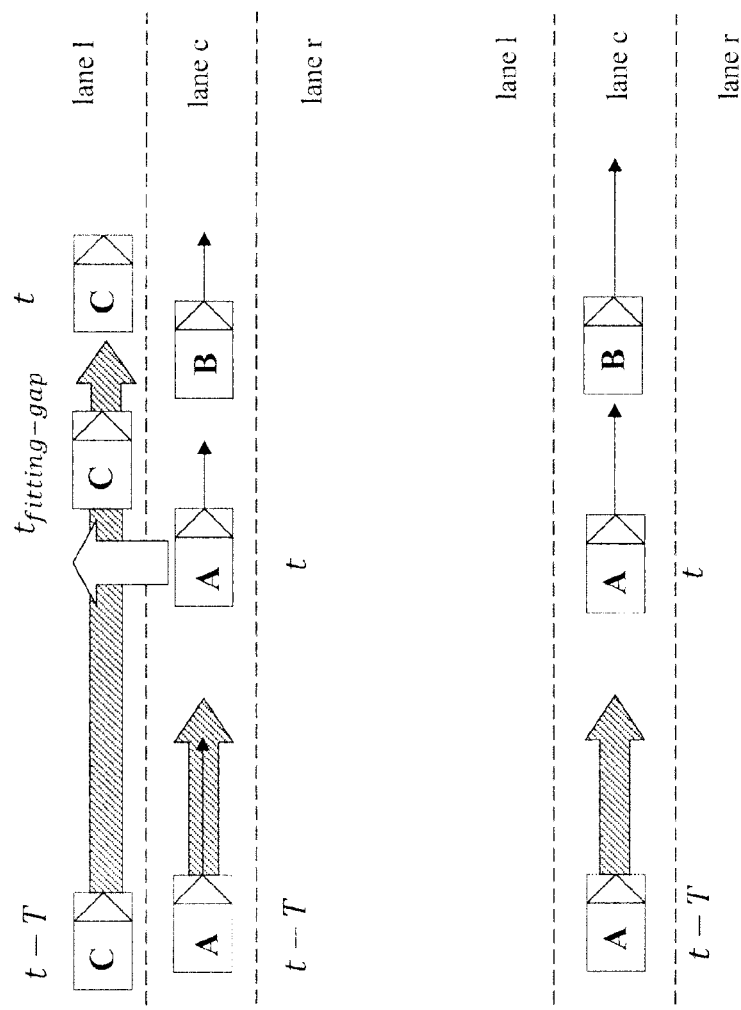
FIGS. 8a and 8b: Schematics for illustrating the solution for FIGS. 3a and 3b.

In the situation of FIGS. 3a and 3b a cut-in of vehicle A shall be predicted in a case where an earlier cut-in of vehicle A was prevented by the blocking of vehicle A which is illustrated in FIG. 8a. At a point in time t−T in the past vehicle A and vehicle C were driving side by side an vehicle A could not change lane although vehicle A was approaching vehicle B. At a later point in time t there is a gap that fits and the gap was identified for the first time at time $t_{fitting-gap}$. Thus, now vehicle A could change lane and thereby cut in.

But in the meantime, which means between the point in time t−T and current time t, vehicle A has slowed down and so the indicator value $v_{approaching-predecessor}^{t}$ would give a value that is 0 and cannot lead to prediction of cutting-in of vehicle A. Thus, to give the correct prediction it is needed to take into consideration that before there is a fitting gap in which vehicle A could cut-in, the intention of the driver of vehicle A likely was to change lane onto lane 1.

The situation is different in FIG. 8b. Again, between the point in time t−T and current time t vehicle A slowed down so that at time t no cut-in has to be predicted. Here, a gap for vehicle A would have been available on lane 1 at point in time t−T, but nevertheless the driver of vehicle A decided to slow down and not to cut-in. This could be for example a situation where the driver already knows that within a short distance he has to take an exit and thus he decides not to overtake. In both cases, the indicator value $v_{approaching-predecessor}^{t}$ at the current time would not give a hint that the driver wants to change the lane. Thus, in order to predict the behavior of vehicle A correctly, it is necessary to take into consideration development of the entire situation and thus indicator values from the past.

Figure 9:
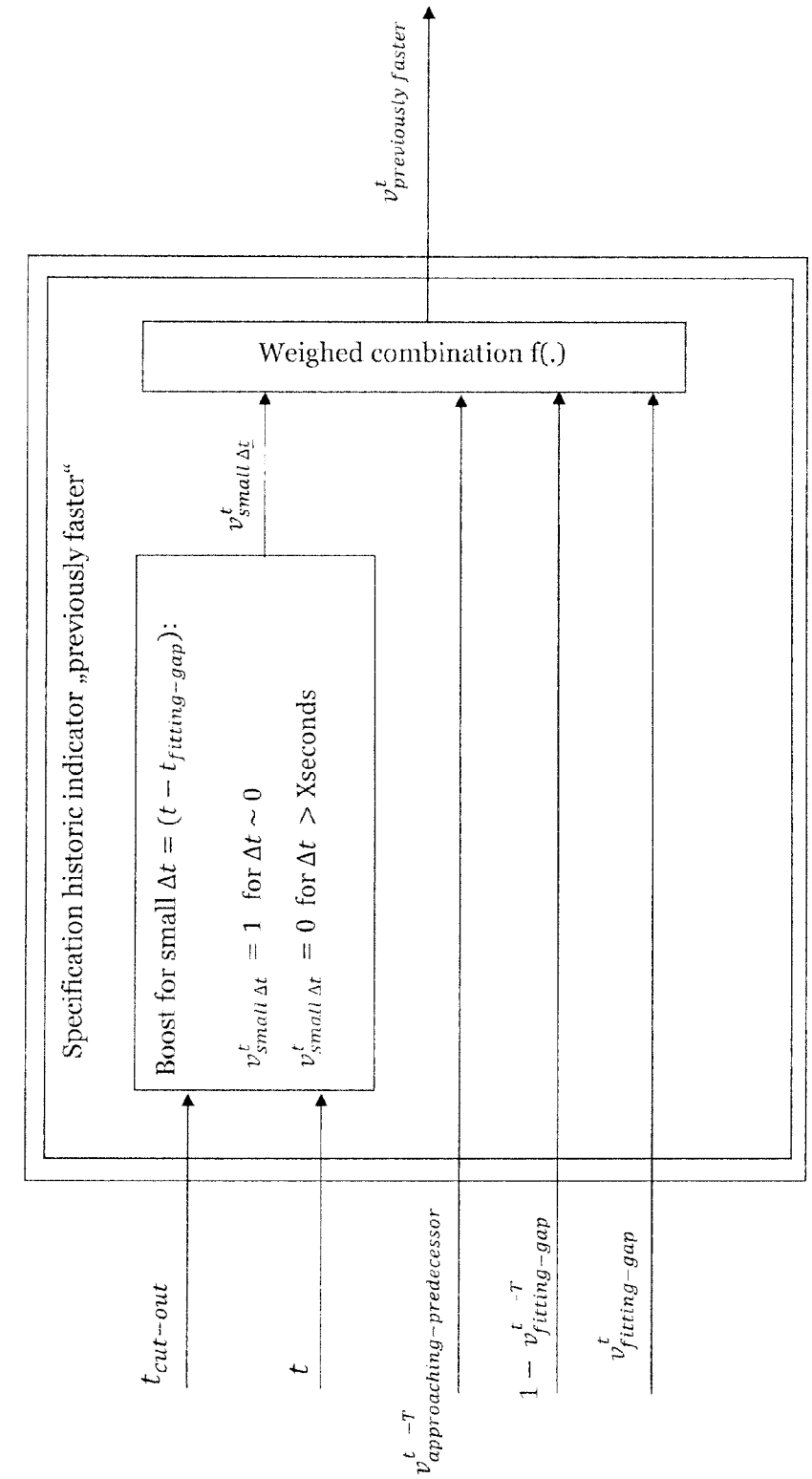
FIG. 9: Schematic illustrating generation of the history indicator in the situation of FIGS. 8a and 8b.

FIG. 9 shows the relevant indicator values that are used in order to calculate an indicator value $v_{previously-faster}^{t}$ for the history indicator $\tau_{previously \, faster}$.

$t_{fitting-gap}$ is the point in time when it is recognized for the first time that a fitting gap would be available for cutting in of vehicle A. Thus, on the basis of the input $t_{fitting-gap}$ and the current time the time difference between t and $t_{fitting-gap}$ is calculated. The first indicator value $v_{small \, \Delta t}^{t}$ is set to 0 for the time difference $\Delta t$ exceeding a particular threshold and is set to 1 for the time difference $\Delta t$ approximately being 0. Alternatively, the first indicator value $v_{small \, \Delta t}^{t}$ could decrease from 1 to 0 with increasing $\Delta t$ continuously. As a further input for the history indicator calculating unit 8 the indicator value $v_{approaching-predecessor}^{t-T}$ for approaching the predecessor at a point in time lying in the past t−T, the indicator value $v_{fitting-gap}^{t}$ for a fitting gap available for vehicle A on the lane of the host vehicle at the current point in time t and 1−the indicator value $v_{fitting-gap}^{t-T}$ for fitting gap available for vehicle A on the lane of the host vehicle at the point in time in the past t−T are used. The combination of the first indicator value $v_{small \, \Delta t}^{t}$ and the indicator values as mentioned above insures that a cut-in is predicted only in case that the blocking by vehicle c only recently ended and furthermore, vehicle A approached vehicle B at that point in time in the past t−T when there was no fitting gap. In any other situation no cut-in will be predicted since either the first indicator value $v_{small \, \Delta t}^{t}$ is 0, the indicator value for approaching the predecessor at t−T already was 0, the indicator value for fitting gap at the current time t is 0 or the indicator value for fitting gap at the time point in the past t−T already was 1 so that the value $1-v_{fitting-left-gap}^{t-T}$ becomes 0. Therein is a parameter defining the time interval which is observed for taking into consideration the history or development of a traffic situation.

The indicator values, like in the examples previously given, may be taken from a memory where values of indicators are stored associated with time.

Above three examples for the history indicator calculation unit 8 have been described distinctly. But it is self-explanatory that all of these examples or at least two can be combined in a common history indicator unit.

The important thing for the present inventions is that an observed previous behavior of the target vehicle A and/or occurrence of a particular situation in the past is used to define a point in time in the past. In the embodiments described this behavior is e.g. the cut-out of vehicle A, the lane change of vehicle A or the existence of a fitting gap for vehicle A. Then at least one indicator value of an indirect indicator at this point in time and the difference between the current point in time t and this particular point of time in the past are used to calculate a history indicator value.

The examples are given for a traffic system in which overtaking usually is performed on a left lane. Of course the system could easily be set up for systems where overtaking may take place on both sides or only on right lanes. The history indicators are suppressed/penalized confidences for calculating classifiers in the context-based prediction or to suppress the result thereof.

The invention claimed is:
1. A method for computationally predicting future movement behavior of a target object, comprising the steps of:
   producing sensor data by at least one sensor physically sensing the environment of a host vehicle;
   computing a plurality of movement behavior alternatives of the target object sensed by the sensors, by predicting movement behaviors of the target object applying a context based prediction step using, for at least one of the plurality of movement behavior alternatives, at least one of indirect indicator or indicator combinations derived from sensor data,
   wherein in said context based prediction step a probability that the target object will execute a movement behavior at a time is estimated;
   estimating a future position of the target object; and
   outputting a signal representing the estimated future position,
   wherein in the context based prediction step, at least one history indicator is used,
   wherein the at least one history indicator being calculated for a current point in time using at least one indicator value of the indirect indicator at a past point in time,
   wherein the past point in time is defined by an observed previous behavior of the target vehicle or an occurrence of a particular situation in the past, and
   wherein the indicator value depending on a time difference between the current point in time and the past point in time, wherein the indicator value is a minimum value when the time difference is below a first threshold, the indicator value is a maximum value when the time difference exceeds a second threshold, and wherein the indicator value increases from the minimum value to the maximum value when the time difference ranges from the first threshold to the second threshold, or wherein the indicator value is the maximum value when the time difference is below the first threshold, the indicator value is the minimum value when the time difference exceeds the second threshold, and wherein the indicator value decreases from the maximum value to the minimum value when the time difference ranges from the first threshold to the second threshold.

2. The method according to claim 1, wherein a second indicator value based on said at least one indirect indicator value is used for calculation of the at least one history indicator.

3. The method according to claim 1, wherein in the context based prediction step probability values are calculated for the plurality of movement behavior alternatives on the basis of indirect indicators, and that the at least one history indicator is applied to the estimated probability values.

4. A driver assistance system, designed for being mounted on a host vehicle and executing the method according to claim 1.

5. The driver assistance system according to claim 4, wherein the system comprises a memory in which indicators and/or indicator values are stored associated with the time.

6. The driver assistance system according to claim 4, wherein the system comprises a processing unit for computing at least the indirect indicators or the history indicators.

7. The driver assistance system according to claim 4, wherein
the driver assistance system is an Adaptive Cruise Control.

8. A non-transitory program storage medium which stores a computer-readable program that, when running on a computer or loaded onto a computer, causes the computer to perform a data recording and reproducing method, wherein the program comprises the steps of:
producing sensor data by at least one sensor physically sensing the environment of a host vehicle;
computing a plurality of movement behavior alternatives of the target object sensed by the sensors, by predicting movement behaviors of the target object applying a context based prediction step using, for at least one of a plurality of movement behavior alternatives, at least one of indirect indicator or indicator combinations derived from sensor data,
wherein in said context based prediction step a probability that the target object will execute a movement behavior at a time is estimated;
estimating a future position of the target object; and
outputting a signal representing the estimated future position,
wherein in the context based prediction step, at least one history indicator is used,
wherein the at least one history indicator being calculated for a current point in time using at least one indicator value of the indirect indicator at a past point in time,
wherein the past point in time is defined by an observed previous behavior of the target vehicle or an occurrence of a particular situation in the past, and wherein the indicator value depending on a time difference between the current point in time and the past point in time,
wherein the indicator value is a minimum value when the time difference is below a first threshold, the indicator value is a maximum value when the time difference exceeds a second threshold, and the indicator value increases from the minimum value to the maximum value when the time difference ranges from the first threshold to the second threshold, or
wherein the indicator value is the maximum value when the time difference is below the first threshold, the indicator value is the minimum value when the time difference exceeds the second threshold, and the indicator value decreases from the maximum value to the minimum value when the time difference ranges from the first threshold to the second threshold.

9. A program that, when running on a computer or loaded onto a computer, causes the computer to perform a data recording and reproducing method, wherein the program comprises the steps of:
producing sensor data by at least one sensor physically sensing the environment of a host vehicle;
computing a plurality of movement behavior alternatives of the target object sensed by the sensors, by predicting movement behaviors of the target object applying a context based prediction step using, for at least one of the plurality of movement behavior alternatives, at least one of indirect indicator or indicator combinations derived from sensor data,
wherein in said context based prediction step a probability that the target object will execute a movement behavior at a time is estimated;
estimating a future position of the target object; and
outputting a signal representing the estimated future position,
wherein in the context based prediction step, at least one history indicator is used, the at least one history indicator being calculated for a current point in time using at least one indicator value of the indirect indicator at a past point in time,
wherein the point in time in the past is defined by an observed previous behavior of the target vehicle or an occurrence of a particular situation in the past, and
wherein the indicator value depending on a time difference between the current point in time and the past point in time,
wherein the indicator value is a minimum value when the time difference is below a first threshold, the indicator value is a maximum value when the time difference exceeds a second threshold, and the indicator value increases from the minimum value to the maximum value when the time difference ranges from the first threshold to the second threshold, or
wherein the indicator value is the maximum value when the time difference is below the first threshold, the indicator value is the minimum value when the time difference exceeds the second threshold, and the indicator value decreases from the maximum value to the minimum value when the time difference ranges from the first threshold to the second threshold.

10. A vehicle including a driver assistance system according to claim 5, wherein the driver assistance system influences controls of the vehicle based on the output signal.

11. The driver assistance system according to claim 4, wherein the driver assistance system is a Collision Warning system.

12. The driver assistance system according to claim 4 wherein the driver assistance system is an Autonomous Driving System.

13. The driver assistance system according to claim 4, wherein the driver assistance system is a Collision Mitigation System.

* * * * *